US012081496B2

(12) United States Patent
Jia et al.

(10) Patent No.: US 12,081,496 B2
(45) Date of Patent: *Sep. 3, 2024

(54) INDICATION OF INTEROPERABILITY AND DEPLOYMENT TESTED TIME-DIVISION DUPLEX SLOT FORMATS

(71) Applicant: AT&T Intellectual Property I, L.P., Atlanta, GA (US)

(72) Inventors: Yupeng Jia, Austin, TX (US); Hongyan Lei, Plano, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 126 days.

This patent is subject to a terminal disclaimer.

(21) Appl. No.: 17/162,266

(22) Filed: Jan. 29, 2021

(65) Prior Publication Data

US 2021/0152321 A1 May 20, 2021

Related U.S. Application Data

(63) Continuation of application No. 16/288,599, filed on Feb. 28, 2019, now Pat. No. 10,951,386.

(Continued)

(51) Int. Cl.
*H04L 5/14* (2006.01)
*H04W 72/0446* (2023.01)

(52) U.S. Cl.
CPC ........... *H04L 5/14* (2013.01); *H04W 72/0446* (2013.01)

(58) Field of Classification Search
CPC .... H04L 5/14; H04L 5/1469; H04W 72/0446; H04W 72/0406; H04W 72/20

(Continued)

(56) References Cited

U.S. PATENT DOCUMENTS 8,054,767 B2 11/2011 Choi et al.
9,432,136 B2 8/2016 Kim et al.

(Continued)

FOREIGN PATENT DOCUMENTS

WO 2018/127171 A1 7/2018
WO 2018/127370 A1 7/2018
WO 2018/127432 A1 7/2018

OTHER PUBLICATIONS

3GPP, "3rd Generation Partnership Project; Technical Specification Group Radio Access Network; NR; Radio Resource Control (RRC) protocol specification (Release 15)," 3GPP TS 38.331 V15.5.1 (Apr. 2019), 491 pages.

(Continued)

*Primary Examiner* — Nizam U Ahmed
(74) *Attorney, Agent, or Firm* — Guntin & Gust, PLC; Miyoung Shin

(57) ABSTRACT

Aspects of the subject matter described herein are directed towards indicating to a wireless network device which time-division duplex slot patterns (slot formats) are supported by a user equipment device, e.g., which slot patterns have gone through interoperability and deployment testing (IODT) successfully with respect to the type of user equipment device. With the supported slot pattern information, the network can make an intelligent decision on scheduling downlink/uplink ratios, while selecting a slot pattern that the user equipment device is known to support. In one aspect, the technology adds a "Slot format IODTed" information element in the user equipment device capability information, which the network obtains when the user equipment device reports its capabilities to the network. In another aspect, the network can query the user equipment device for the supported slot format information.

20 Claims, 10 Drawing Sheets

Related U.S. Application Data

(60) Provisional application No. 62/733,741, filed on Sep. 20, 2018.

(58) Field of Classification Search
USPC .......................................................... 370/280
See application file for complete search history.

(56) References Cited

U.S. PATENT DOCUMENTS

| | | | |
|---|---|---|---|
| 9,775,151 B2 | 9/2017 | Jung et al. | |
| 9,877,321 B2 | 1/2018 | Visotsky et al. | |
| 2012/0014296 A1* | 1/2012 | Sung | H04L 1/1607 370/280 |
| 2015/0334702 A1 | 11/2015 | Ji et al. | |
| 2017/0332396 A1 | 11/2017 | Liao et al. | |
| 2018/0034598 A1 | 2/2018 | Yiu et al. | |
| 2018/0049052 A1* | 2/2018 | Doshi | H04W 24/06 |
| 2018/0091285 A1* | 3/2018 | Hosseini | H04L 5/0007 |
| 2018/0097547 A1 | 4/2018 | Turtinen et al. | |
| 2018/0213554 A1 | 7/2018 | Zeng et al. | |
| 2018/0227949 A1 | 8/2018 | Tiirola et al. | |
| 2018/0279223 A1* | 9/2018 | Kim | H04L 5/0053 |
| 2020/0065123 A1* | 2/2020 | Yang | G06F 9/455 |
| 2020/0288443 A1* | 9/2020 | Ljung | H04W 72/21 |
| 2020/0344832 A1* | 10/2020 | Hu | H04W 72/0453 |
| 2021/0307016 A1* | 9/2021 | Takeda | H04L 5/16 |

OTHER PUBLICATIONS

3GPP, "3rd Generation Partnership Project; Technical Specification Group Radio Access Network; NR; Physical channels and modulation (Release 15)," 3GPP TS 38.211 Release 15 2 V15.1.0 {Mar. 2018), 90 pages.

Non-Final Office Action received for U.S. Appl. No. 16/288,599 dated Apr. 6, 2020, 30 pages.

U.S. Appl. No. 16/288,599, filed Feb. 28, 2019.

* cited by examiner

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56 – 255 | Reserved | | | | | | | | | | | | | |

```
}
Phy-ParametersXDD-Diff ::= SEQUENCE {
    dynamicSFI                          ENUMERATED {supported}      OPTIONAL,
    SlotFormatIODTed                    ENUMERATED {supported}      OPTIONAL
                                                                402
    twoPUCCH-F0-2-ConsecSymbols         ENUMERATED {supported}      OPTIONAL,
    twoDifferentTPC-Loop-PUSCH          ENUMERATED {supported}      OPTIONAL,
    twoDifferentTPC-Loop-PUCCH          ENUMERATED {supported}      OPTIONAL,
    ...
}
Phy-ParametersFRX-Diff ::= SEQUENCE {
    dynamicSFI                          ENUMERATED {supported}      OPTIONAL,
    SlotFormatIODTed                    ENUMERATED {supported}      OPTIONAL
                                                                404
    oneFL-DMRS-TwoAdditionalDMRS        BIT STRING (SIZE (2))       OPTIONAL,
```

FIG. 4

INDICATION OF INTEROPERABILITY AND DEPLOYMENT TESTED TIME-DIVISION DUPLEX SLOT FORMATS

CROSS-REFERENCE TO RELATED APPLICATIONS

The subject patent application is a continuation of, and claims priority to, U.S. patent application Ser. No. 16/288,599, filed Feb. 28, 2019, and entitled "INDICATION OF INTEROPERABILITY AND DEPLOYMENT TESTED TIME-DIVISION DUPLEX SLOT FORMATS", which applications claim priority to U.S. Provisional Patent Application No. 62/733,741, filed on Sep. 20, 2018 entitled "INDICATION OF INTEROPERABILITY AND DEPLOYMENT TESTED TIME-DIVISION DUPLEX SLOT FORMATS", each of which applications are hereby incorporated by reference herein.

TECHNICAL FIELD

The subject application is related to wireless communication systems, and, for example, to directing the dynamic selection of slot formats to facilitate flexible time-division duplex (TDD) scheduling operations.

BACKGROUND

In New Radio (NR), often referred to as 5G, a standard, e.g., 3$^{rd}$ generation partnership project (3GPP) defines 56 time-division duplex slot formats depending on downlink/uplink (DL/UL) TDD symbol ratios. Dynamic selection of one of the slot formats allows flexible TDD scheduling operations, in that dynamic selection allows the DL/UL ratio to be adjusted based on current traffic needs, e.g., 3:1 downlink to uplink for a while, then 1:1, and so on. However, in current 5G deployment, infrastructure vendors can only support very limited slot formats, as only some slot patterns can have gone through interoperability and deployment testing (IODT) successfully; note that as used herein, "slot pattern" and "slot format" (as referred to in in 3GPP specifications) are used interchangeably.

Currently in 3GPP, when the network informs the user equipment of the UL/DL ratio (corresponding to the slot pattern), the user equipment has to follow the network configured DL/UL ratios within the specified one of the 56 slot formats even if not supported by having been successfully IODT tested. In other words, a user equipment has to follow network signaling to deal with all 56 slot patterns, including those that are not considered supported, that is, have not went through interoperability and deployment testing for that type of user equipment device.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 3 is an example representation of available slot formats, with an indication of certain slot formats that are supported by a given user equipment, in accordance with various aspects and embodiments of the subject disclosure.

FIG. 4 is an example representation of how one current standard can be enhanced to support the reporting of the slot pattern IODT-ed information via the addition of information elements, in accordance with various aspects and embodiments of the subject disclosure.

DETAILED DESCRIPTION

Figure 1:
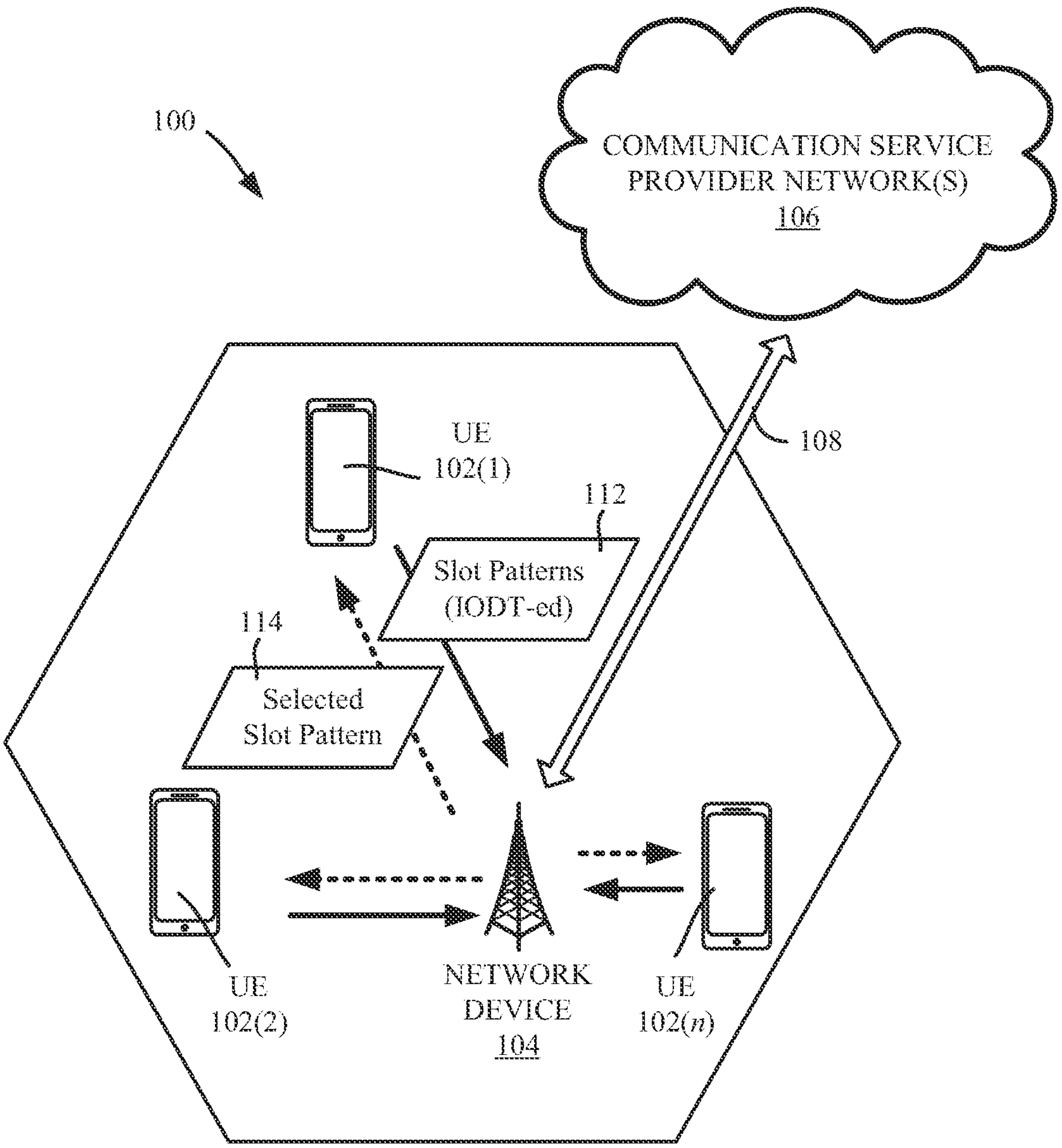
FIG. 1 illustrates an example wireless communication system in which a user equipment reports supported slot pattern data to a network device for use in selecting a selected slot pattern, in accordance with various aspects and embodiments of the subject disclosure.

Various aspects of the technology described herein are directed towards a signaling technology for a user equipment to indicate to the network which time-division duplex slot patterns have went through interoperability and deployment testing (IODT) successfully with respect to the user equipment, e.g., on a test device(s) of a type corresponding to the user equipment. Based on knowing this information, the network can make an intelligent decision on scheduling downlink/uplink ratios, and thus select a slot pattern which the user equipment is known to support, because of the slot pattern having successfully gone through IODT. That is, the user equipment has been interoperability and deployment tested for the selected slot pattern, which helps to improve network robustness.

To this end, in one aspect, the technology described herein adds a "Slot format IODTed" information element in the user equipment capability information that the network obtains when the user equipment connects to the network, e.g., when the user equipment reports its capabilities. In this way, the network can schedule resources based on a user equipment's capability with respect to supported slot pattern(s). In another aspect, the network can query the user equipment for this information.

It should be understood that any of the examples and terms used herein are non-limiting. For instance, the examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. For example, legacy LTE devices similarly can leverage the technology described herein. Thus, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is data plus speech is simultaneously scheduled).

FIG. 1 illustrates an example wireless communication system 100 in accordance with various aspects and embodiments of the subject technology. In one or more embodiments, the system 100 can comprise one or more user equipment UEs 102(1)-102(*n*).

In various embodiments, the system 100 is or comprises a wireless communication network serviced by one or more wireless communication network providers. In example embodiments, a UE 102 can be communicatively coupled to the wireless communication network via a network device 104 (e.g., network node). The network device 104 can communicate with the user equipment (UE) 102, thus providing connectivity between the UE and the wider cellular network.

In example implementations, each UE 102 such as the UE 102(1) is able to send and/or receive communication data via a wireless link to the network device 104. The dashed arrow lines from the network device 104 to the UE 102 represent downlink (DL) communications and the solid arrow lines from the UE 102 to the network devices 104 represents uplink (UL) communications.

The system 100 can further include one or more communication service provider networks 106 that facilitate providing wireless communication services to various user equipment, including UEs 102(1)-102(*n*), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured to report (block 112) which slot patterns are supported by that user equipment, because of having been interoperability and deployment tested ("IODT-ed"). This can occur automatically when the user equipment (e.g., 102(1)) connects to the network device 104 and reports its capability data. This can be via a series of one or more integers (or theoretically an error code if no slot patterns have been IODT-ed), or via a bitmap. Note that at present, the standard defines 256 slot patterns numbered 0-255 (56-255 are presently reserved). Once the network device 104 has this information from the user equipment 102(1), the network device can select a selected slot pattern 114 and communicate information representing the selected slot pattern 114 to the user equipment 102(1).

Figure 2:
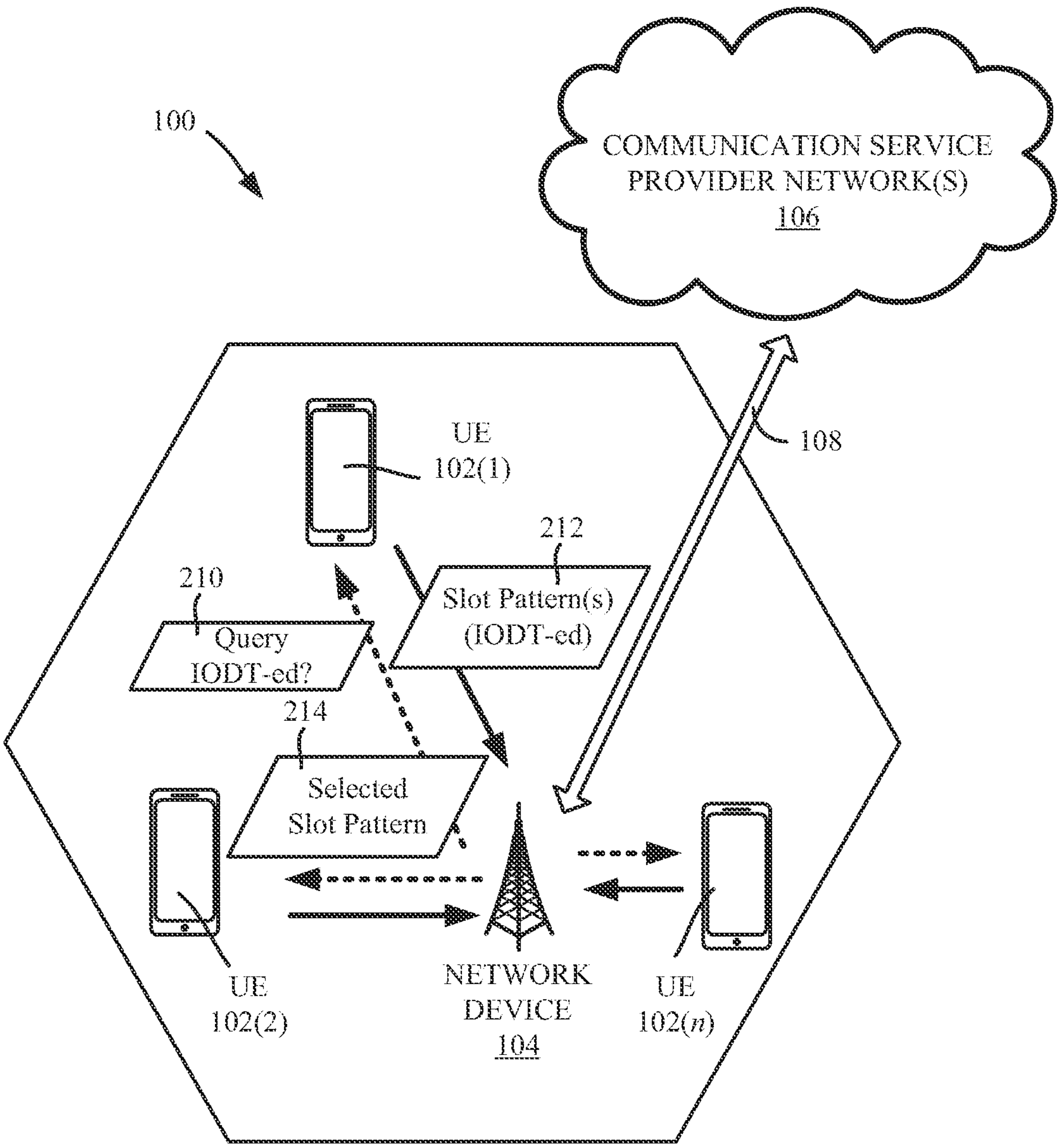
FIG. 2 illustrates an example wireless communication system in which a network device queries a user equipment to report supported slot pattern data for use in selecting a selected slot pattern, in accordance with various aspects and embodiments of the subject disclosure.

As represented in FIG. 2, as an alternative (or in addition) to initial reporting of the supported slot patterns, the network device 104 can send a query (block 210) to the user equipment requesting the information. In other words, at any time the network can trigger the user equipment inquiry and ask the user equipment to report the slot patterns that are supported, e.g., those that have completed IODT with infrastructure vendors. The user equipment responds with the information 212, e.g., via one or more integers or (likely more efficiently) a bitmap. Once the network device 104 has this information from the user equipment 102(1), the network device can select a selected slot pattern 214 and communicate information representing the selected slot pattern 214 to the user equipment 102(1).

By way of example, FIG. 3 shows the slot formats specified in 3GPP TS 38.211 V15.1.0 (2018-03), which is in Table 4.3.2-3: Slot formats for normal cyclic prefix; OFDM (Orthogonal Frequency Division Multiplexing) symbols in a slot can be classified as 'downlink' (denoted 'D' in Table 4.3.2-3), 'flexible' (denoted 'X'), or 'uplink' (denoted 'U'). Consider that a user equipment (because of having been IODT-ed) supports slot patterns 28, 29 and 34, as represented by the dashed boxes labeled 302 and 304. Upon connecting to the network (e.g., FIG. 1), and/or in response to a query from the network (e.g., FIG. 2), a user equipment reports {28, 29 and 34} to the network device 104. Note that this can be in a bitmap, e.g., with a one (1) indicating supported and a zero bit (0) indicating not supported in a corresponding bit position. The network can then schedule/select from TDD ratios that it knows the user equipment supports. This can be individually sent (unicast) to each user equipment, or multicast/broadcast as appropriate.

During a handover, this IODT-ed slot pattern informational element can be passed from the source cell to the target cell in a handover message. This avoids having the user equipment have to re-report the IODT-ed slot pattern informational element when a new cell is entered.

An indication also can be sent (e.g., when first connecting) by a user equipment to indicate that all slot patterns are supported and IODT-ed slot pattern reporting can be turned off. Note that this can be efficient in a query-response implementation to short circuit unneeded communications, e.g., in an initial report the user equipment can basically indicate to the network to not bother querying because the user equipment can work with any slot pattern. A two-level system can be implemented, e.g., 1,X (where X is ignored) indicates all slot patterns supported, while 0,Y (where Y is the bitmap) indicates that the bitmap contains the relevant information. Another possibility is to send a {0, count, integer set} communication, e.g., in FIG. 3 {0, 3, 28, 29, 34} can be sent to indicate that not all slot patterns are supported, three are supported, and those three are 28, 29 and 34. Exclusions can also be sent, e.g., all slot patterns are supported except Z (where Z is a set of one or more integers).

FIG. 4 shows how a current standard can be enhanced to support the reporting of the slot pattern IODT-ed information, e.g., via the addition of the text shown in dashed blocks 402 and 404. For example, this information element (IE) can be added to the 3GPP TS 38.331 standard. More particularly, as shown in FIG. 4, the technology described herein can add a "Slot Format IODTed" information element to 3GPP TS 38.331, section 6.3.3, UE capability information elements, Phy-Parameters IE. Further, the technology described herein can similarly add a "slot pattern IODT" IE to 3GPP TS 38.331, UE-CapabilityEnquiry IE.

As can be readily appreciated, the slot pattern format IODT capability in a user equipment can be updated during a software/firmware update. The next time that the user equipment connects to the network, the updated user equipment (typically) will be able to support more slot patterns and report a larger number of supported slot patterns and to the network, e.g., initially or in response to a network request.

Figure 5:
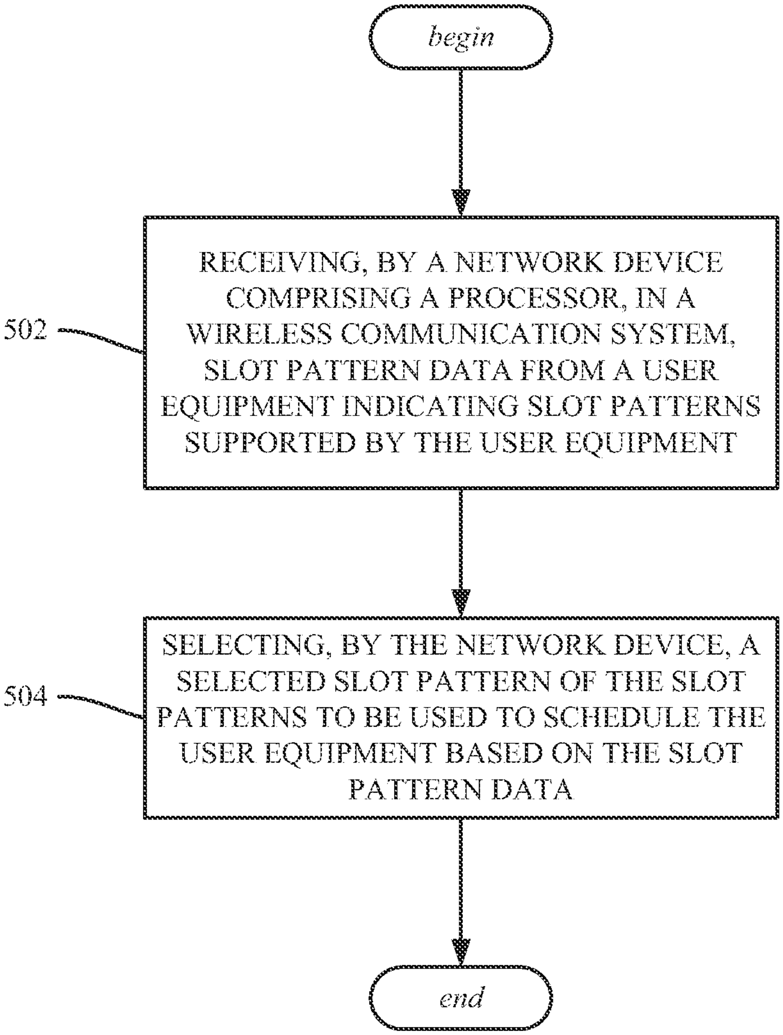
FIG. 5 illustrates example operations of a network device with respect to receiving supported slot pattern data, in accordance with various aspects and embodiments of the subject disclosure.

One or more aspects, such as those implemented in example operations of a method, are shown in FIG. 5 in accordance with various aspects and embodiments of the subject disclosure. Operation 502 represents receiving, by a network device comprising a processor, in a wireless communication system, slot pattern data from a user equipment indicating slot patterns supported by the user equipment. Operation 504 represents selecting, by the network device, a selected slot pattern of the slot patterns to be used to schedule the user equipment based on the slot pattern data.

Receiving the slot pattern data from the user equipment indicating the slot patterns supported by the user equipment can comprise receiving the slot pattern data indicating which of the slot patterns have been interoperability and deployment tested. Receiving the slot pattern data from the user equipment can comprise receiving the slot pattern data as part of capability reporting by the user equipment.

Aspects can comprise communicating a query for the slot pattern data to the user equipment; receiving the slot pattern data from the user equipment can occur in response to the communicating the query. The network device can comprise a first network device that corresponds to a source cell; aspects can comprise, communicating, by the first network device, the slot pattern data to a second network device that corresponds to a target cell, as part of a handover of the user equipment to the second network device.

Receiving the slot pattern data can comprise receiving a bitmap comprising respective bits corresponding to respective slot patterns, and wherein, for a respective bit of the respective bits, a first value of the respective bit indicates that a corresponding slot pattern has been interoperability and deployment tested and a second value of the respective bit indicates that the corresponding slot pattern has not been interoperability and deployment tested.

Receiving the slot pattern data can comprise receiving an inclusion group comprising one or more integers, in which an integer in the inclusion group corresponds to a slot pattern that has been interoperability and deployment tested. Receiving the slot pattern data can comprise receiving an exclusion group comprising one or more integers, in which an integer in the exclusion group corresponds to a slot pattern that has not been interoperability and deployment tested.

Aspects can comprise communicating, by the network device to the user equipment, information representing the selected slot pattern.

Figure 6:
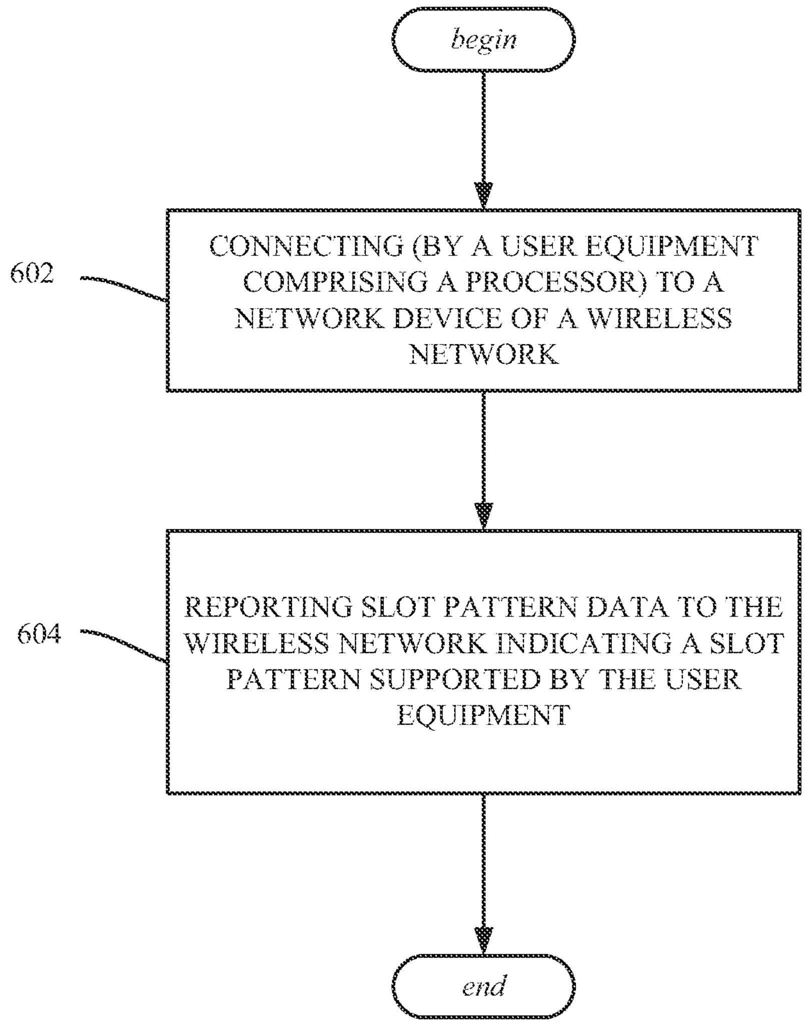
FIG. 6 illustrates example operations of a user equipment device with respect to providing supported slot pattern data to a network device, in accordance with various aspects and embodiments of the subject disclosure.

One or more example aspects are represented in FIG. 6, and can correspond to a user equipment device comprising a processor and a memory that stores executable instructions that, when executed by the processor, facilitate performance of operations and/or components. Example operations comprise operation 602, which represents connecting to a network device of a wireless network. Operation 604 represents reporting slot pattern data indicating a slot pattern supported by the user equipment.

The reporting can occur automatically in response to the connecting. Aspects can comprise receiving a request from the slot pattern data from the network device; the reporting can occur in response to the request.

Reporting the slot pattern data indicating the slot pattern supported by the user equipment can comprise reporting slot pattern data indicating that the slot pattern has been interoperability and deployment tested with respect to a type of the user equipment device.

The slot pattern data can comprise first slot pattern data, and aspects can comprise receiving an update to the user equipment device that changes the first slot pattern data to second slot pattern data.

Further operations can comprise receiving information from the network device representing a selected slot pattern.

Figure 7:
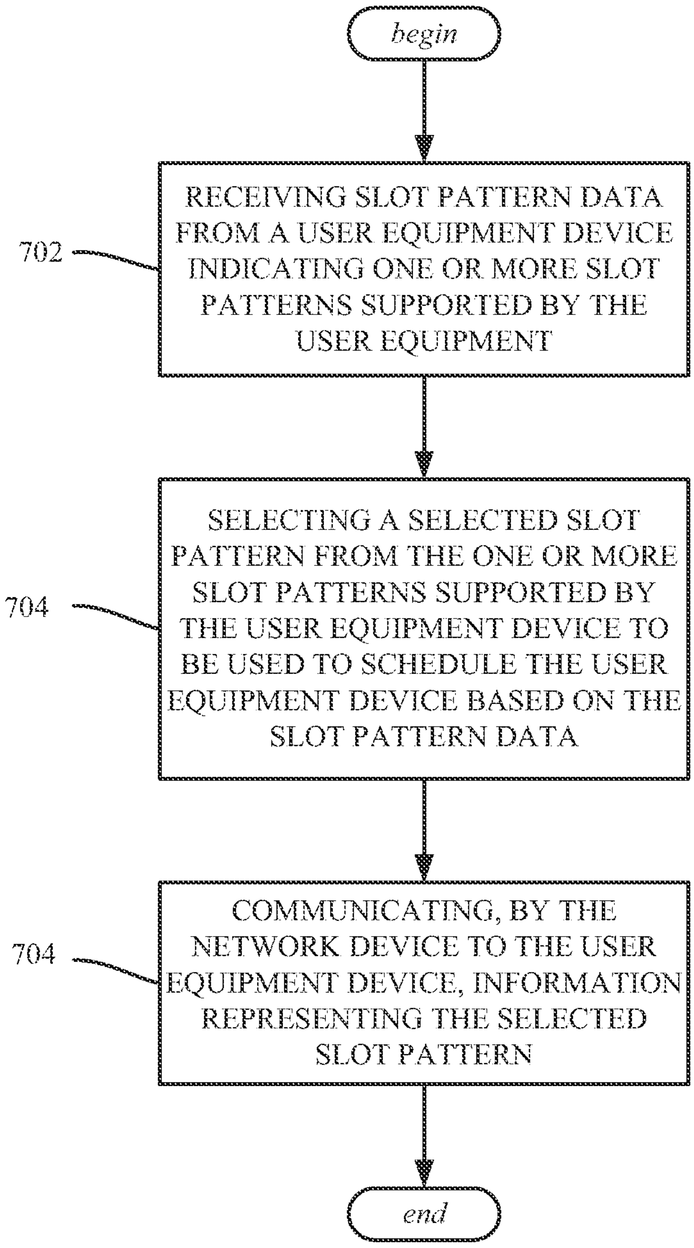
FIG. 7 illustrates example operations of a network device with respect to receiving and using supported slot pattern data, in accordance with various aspects and embodiments of the subject disclosure.

One or more aspects, such as implemented in a machine-readable storage medium, comprising executable instructions that, when executed by a processor of a network device of a wireless communication system, facilitate performance of operations, are represented in FIG. 7. Example operations comprise operation 702, which represents receiving slot pattern data from a user equipment device indicating one or more slot patterns supported by the user equipment device. Operation 704 represents selecting a selected slot pattern from the one or more slot patterns supported by the user equipment device to be used to schedule the user equipment device based on the slot pattern data. Operation 706 represents communicating, by the network device to the user equipment device, information representing the selected slot pattern.

Receiving the slot pattern data can comprise receiving the slot pattern data as part of capability reporting by the user equipment.

Further operations can comprise querying the user equipment for the slot pattern data; receiving the slot pattern data from the user equipment occurs in response to the querying.

The network device can be a first network device, and further operations can comprise communicating, by the first network device, the slot pattern data to a second network device as part of a handover of the user equipment to the second network device. Receiving the slot pattern data can comprise receiving a bitmap comprising respective bits corresponding to respective slot patterns, and wherein, for a respective bit of the respective bits, a first value of the respective bit indicates that a corresponding slot pattern has been interoperability and deployment tested and a second value of the respective bit indicates that the corresponding slot pattern has not been interoperability and deployment tested.

As can be seen, this slot pattern format IODT capability information element is reported to network when the user equipment is connected to the network, sand/or the network can ask the user equipment to report its IODT capability information when needed. The network can utilize this information element to optimize network robustness. Once provided, the slot pattern format IODT capability information element can be passed from a source cell to a target cell during handover. Further, as more slot patterns undergo IODT, user equipment vendors can update the slot pattern IODT a during firmware/software update.

Figure 8:
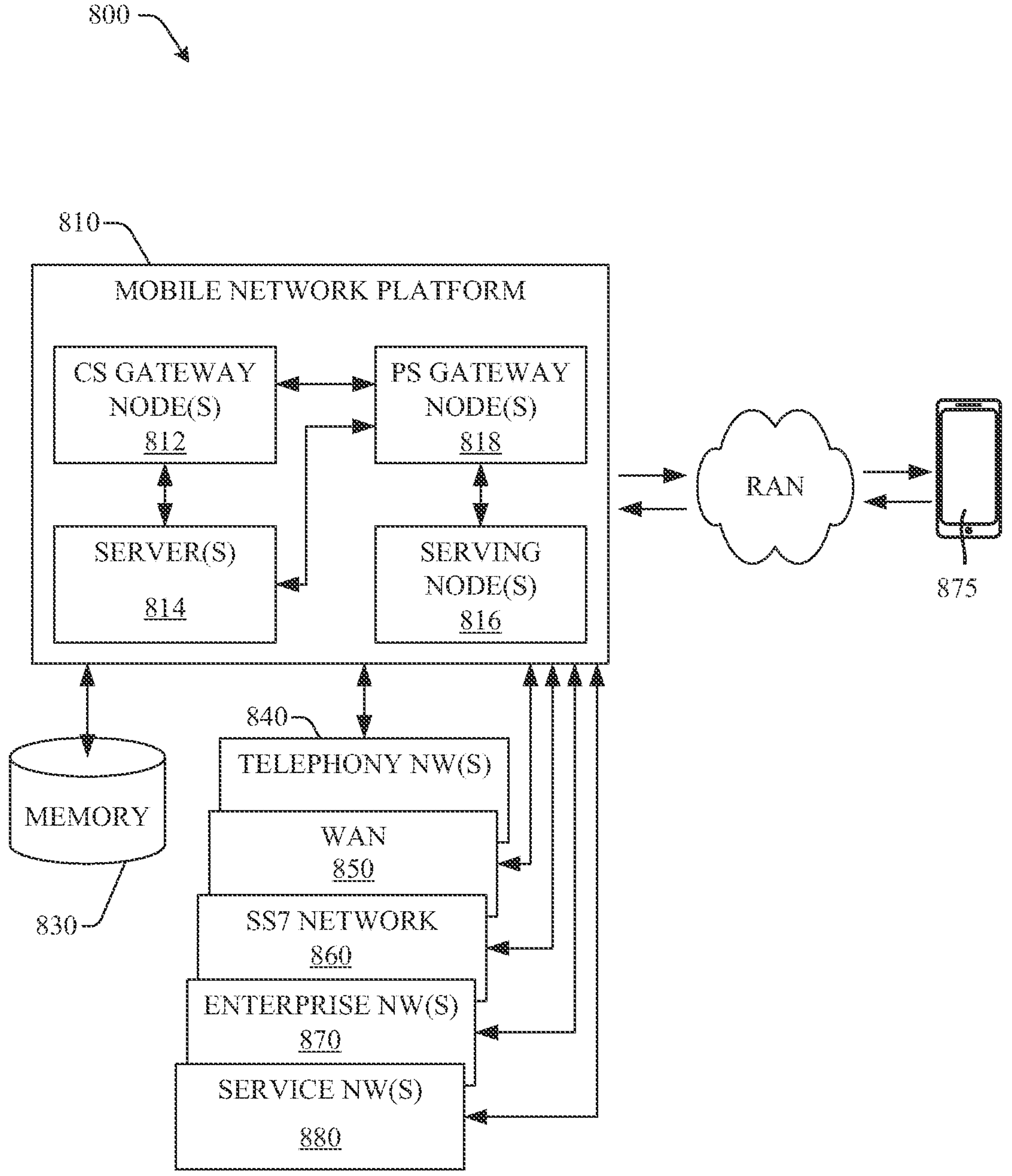
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks like telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) like IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It is should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
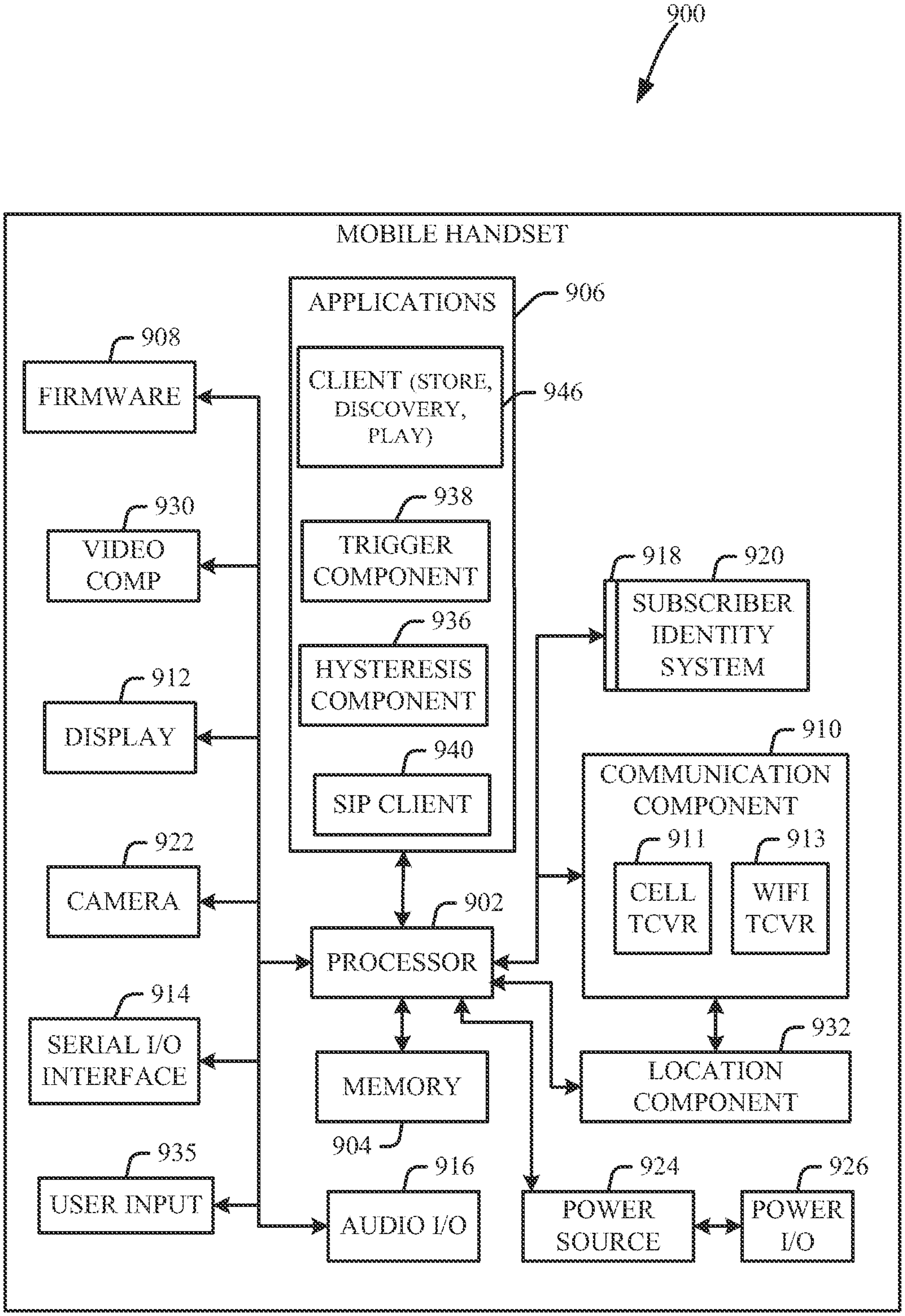
FIG. 9 illustrates an example block diagram of an example user equipment that can be a mobile handset in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
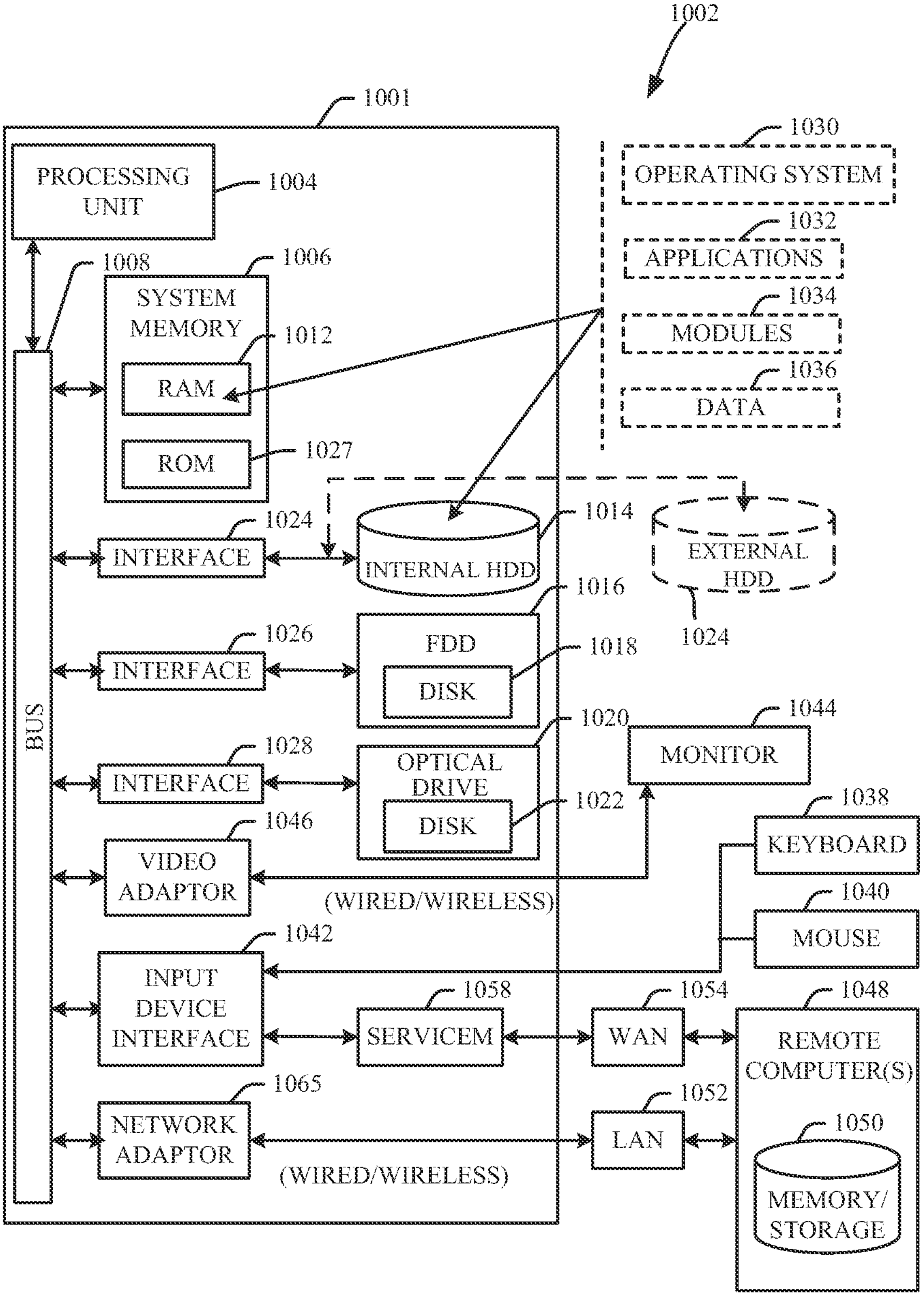
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, GNB 202, etc.) may contain components as described in FIG. 10. The computer 1000 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:

receiving, by network equipment comprising a processor, from a user equipment, slot pattern data indicating which slot patterns of a group of slot patterns defined for a communication protocol are supported by the user equipment, wherein the slot patterns correspond to one or more slots among time divisional duplex (TDD) slot patterns numbered between zero and a first number and each slot includes a second number of symbols, wherein the second number of symbols includes Orthogonal Frequency Division Multiplexing (OFDM) symbols to be classified as a downlink symbol, a flexible symbol, or an uplink symbol, wherein the slot patterns supported by the user equipment have been interoperability and deployment tested on a test device that corresponds to a type of the user equipment, and wherein the slot pattern data received from the user equipment indicate, via one or more integers or a bitmap of a zero bit and a one bit, the slot patterns supported by the user equipment, and the one or more integers indicate one or more supported slot numbers or one or more excluded slot numbers; and scheduling, by the network equipment, network resources for the user equipment to communicate according to the communication protocol based on the slot patterns supported by the user equipment and uplink/downlink TDD symbol ratios of the supported slot patterns.

2. The method of claim 1, further comprising communicating, by the network equipment, a query for the slot pattern data to the user equipment, and wherein receiving the slot pattern data from the user equipment occurs in response to the communicating.

3. The method of claim 1, wherein the network equipment comprises first network equipment that corresponds to a source cell, and further comprising, communicating, by the first network equipment, the slot pattern data to second network equipment that corresponds to a target cell, as part of a handover of the user equipment from the first network equipment to the second network equipment.

4. The method of claim 1, wherein the slot pattern data comprises an inclusion group comprising at least one indicator corresponding to at least one slot pattern that has been interoperability and deployment tested for the type of the user equipment.

5. The method of claim 1, wherein the slot pattern data comprises an exclusion group comprising at least one indicator corresponding to at least one first slot pattern that has not been interoperability and deployment tested for the type of the user equipment.

6. The method of claim 1, further comprising communicating, by the network equipment, information corresponding to the slot patterns to the user equipment.

7. A network device, comprising:

a processor; and a memory that stores executable instructions that, when executed by the processor, facilitate performance of operations, the operations comprising:

receiving, from a user equipment, slot pattern data indicating which slot patterns of a group of slot patterns defined for a network protocol are supported by the user equipment, wherein the slot patterns correspond to one or more slots among time divisional duplex (TDD) slot patterns numbered between zero and a first number and each slot includes a second number of symbols, wherein the second number of symbols includes Orthogonal Frequency Division Multiplexing (OFDM) symbols to be classified as a downlink symbol, a flexible symbol, or an uplink symbol, wherein the slot patterns supported by the user equipment have been interoperability and deployment tested using a test device that matches a type of the user equipment, and wherein the slot pattern data received from the user equipment indicate, via one or more integers or a bitmap of a zero bit and a one bit, the slot patterns supported by the user equipment, and the one or more integers indicate one or more supported slot numbers or one or more excluded slot numbers; and scheduling at least one network resource for the user equipment to communicate according to the network protocol based on the slot patterns supported by the user equipment and uplink/downlink TDD symbol ratios of the supported slot patterns.

8. The network device of claim 7, wherein the operations further comprise communicating a query for the slot pattern data to the user equipment, and wherein receiving the slot pattern data from the user equipment occurs in response to the communicating.

9. The network device of claim 7, wherein the network device comprises a first network device that corresponds to a source cell, and the operations further comprise communicating the slot pattern data to a second network device that corresponds to a target cell, as part of a handover of the user equipment from the first network device to the second network device.

10. The network device of claim 7, wherein the slot pattern data comprises an inclusion group comprising at least one indicator corresponding to at least one slot pattern that has been interoperability and deployment tested for the type of the user equipment.

11. The network device of claim 7, wherein the slot pattern data comprises an exclusion group comprising at least one indicator corresponding to at least one first slot pattern that has not been interoperability and deployment tested for the type of the user equipment.

12. The network device of claim 7, wherein the operations further comprise communicating information corresponding to the slot pattern data to the user equipment.

13. A non-transitory machine-readable medium, comprising executable instructions that, when executed by a processor of network equipment, facilitate performance of operations, the operations comprising:

receiving, from a user equipment, slot pattern data indicating which slot patterns of a group of slot patterns defined for a wireless communication protocol are supported by the user equipment, wherein the group of slot patterns correspond to one or more slots among time divisional duplex (TDD) slot patterns numbered between zero and a first number and each slot includes a second number of symbols, wherein the second number of symbols includes Orthogonal Frequency Division Multiplexing (OFDM) symbols to be classified as a downlink symbol, a flexible symbol, or an uplink symbol, wherein the slot patterns supported by the user equipment have been interoperability and deployment tested via a test device that is alike to a type of the user equipment; and scheduling the user equipment to communicate according to the wireless communication protocol based on the slot patterns supported by the user equipment and uplink/downlink TDD symbol ratios of the supported slot patterns.

14. The non-transitory machine-readable medium of claim 13, wherein the operations further comprise communicating a query for the slot pattern data to the user equipment, and wherein receiving the slot pattern data from the user equipment occurs in response to the communicating.

15. The non-transitory machine-readable medium of claim 13, wherein the network equipment comprises first network equipment that corresponds to a source cell, and wherein the operations further comprise communicating the slot pattern data to second network equipment that corresponds to a target cell, as part of a handover of the user equipment from the first network equipment to the second network equipment.

16. The non-transitory machine-readable medium of claim 13, wherein the slot pattern data comprises an inclusion group comprising at least one slot number that has been interoperability and deployment tested for the type of the user equipment.

17. The non-transitory machine-readable medium of claim 13, wherein the slot pattern data comprises an exclusion group comprising at least one slot number that has not been interoperability and deployment tested for the type of the user equipment.

18. The non-transitory machine-readable medium of claim 13, wherein the operations further comprise communicating information corresponding to the slot pattern data to the user equipment.

19. The non-transitory machine-readable medium of claim 13, wherein the slot pattern data received from the user equipment indicate, via one or more integers, one or more slot numbers, and the one or more integers indicate one or more supported slot numbers or one or more excluded slot numbers.

20. The non-transitory machine-readable medium of claim 13, the slot pattern data received from the user equipment indicate, via a bitmap of a zero bit and a one bit, one or more supported slot numbers and one or more unsupported slot numbers.

* * * * *